United States Patent
Lynde

(10) Patent No.: US 6,167,958 B1
(45) Date of Patent: Jan. 2, 2001

(54) CUTTING MATRIX AND METHOD OF APPLYING THE SAME

(75) Inventor: Gerald D. Lynde, Houston, TX (US)

(73) Assignee: Baker Hughes Incorporated, Houston, TX (US)

( * ) Notice: Under 35 U.S.C. 154(b), the term of this patent shall be extended for 0 days.

(21) Appl. No.: 09/014,854

(22) Filed: Jan. 29, 1998

(51) Int. Cl.[7] .................................................. B23P 15/28
(52) U.S. Cl. .................... 166/55.6; 175/426; 407/113; 407/115; 407/116; 407/114
(58) Field of Search ................... 166/298, 55.6; 175/426; 407/113–116

(56) References Cited

U.S. PATENT DOCUMENTS

| | | | |
|---|---|---|---|
| 3,605,924 | * 9/1971 | Donegan | 175/400 |
| 3,726,351 | * 4/1973 | Williams Jr. | 175/426 |
| 3,786,541 | * 1/1974 | Lundgren | 407/116 |
| 4,344,725 | * 8/1982 | Seidel | 407/114 |
| 4,978,260 | 12/1990 | Lynde et al. | 166/55.6 |
| 4,984,488 | 1/1991 | Lynde et al. | 76/115 |
| 5,038,859 | 8/1991 | Lynde et al. | 166/55.6 |
| 5,046,899 | * 9/1991 | Nishi | 407/113 X |
| 5,209,611 | * 5/1993 | Drescher | 407/114 X |
| 5,522,461 | 6/1996 | Carter et al. | 166/298 |
| 5,626,189 | 5/1997 | Hutchinson | 166/55.6 |

FOREIGN PATENT DOCUMENTS

| 834870 | 5/1960 | (GB). |
|---|---|---|
| 1437428 | 5/1976 | (GB). |
| 2032817 | 5/1980 | (GB). |
| 0 222 317 | 5/1987 | (WO). |

\* cited by examiner

*Primary Examiner*—Eileen D. Lillis
*Assistant Examiner*—Sunil Singh
(74) *Attorney, Agent, or Firm*—Gerald W. Spinks

(57) ABSTRACT

A method for applying cutting elements to a tool for cutting or milling a metal item in a well, along with the cutting element used in the method. The tool can include one or more blades extending outwardly or downwardly from the tool for cutting a metal item such as the wall of a casing string, or for removing a predetermined length of a casing string in a cutting action. The blade or blades have cutting elements positioned on the leading faces of the blades to engage the casing string or other metal item in the bore hole. Each cutting element is composed of a plurality of effective cutting faces. Each cutting face can have a substantially triangular shape, or a substantially square shape, or some other geometric shape. The cutting elements can be arranged in a random pattern. Each cutting element can be oriented in a random orientation relative to the blade. The cutting elements are shaped so that, regardless of the positioning or orientation of a given cutting element, it will continually present a sharp cutting edge to the metal object being cut. Each cutting face of each cutting element can also have one or more surface irregularities to cause the metal chips cut from the casings to break off at short lengths.

21 Claims, 2 Drawing Sheets

CUTTING MATRIX AND METHOD OF APPLYING THE SAME

CROSS REFERENCE TO RELATED APPLICATIONS

Not Applicable

FEDERALLY SPONSORED RESEARCH OR DEVELOPMENT

Not Applicable

BACKGROUND OF THE INVENTION

This invention relates generally to a new method for applying a plurality of cutting edges to a tool for cutting or milling downhole metal items, such as fixed casing strings in a well bore, and to a new type of cutting element used in this method.

Heretofore, cutting tools for cutting metal items downhole, such as well casing or casing strings, have been provided with one of two types of cutting elements mounted on the cutting surfaces of the cutting tool. Generally, the two types of cutting elements which have been used are an aggregate of crushed tungsten carbide particles, or a pattern of whole cutting inserts. The cutting surfaces on which the aggregate or whole inserts are mounted have been fixed blades, swinging blades, or the tool body itself, depending upon the intended function of the tool.

Generally, the whole insert type of cutting element has been made of cutting grade tungsten carbide, in the shape of discs, triangles, rectangles, parallelograms, or other shapes. These inserts have been bonded to the cutting tool, sometimes in a uniform pattern, and sometimes in a random pattern. The random pattern is easier and more economical to apply, but the uniform pattern has been more effective. Most of these whole inserts have had generally flat front faces, and generally flat rear faces, with the rear face being bonded to the cutting tool, and the front face being presented to the workpiece as a cutting face. Most of these inserts also have substantially parallel front and rear faces. One other known insert is a pyramid shape having four flat triangular sides.

It is important to cut relatively short, thick, metal chips from the workpiece, to allow efficient removal of the chips from the well, via the flow of drilling fluid. If this is not done, long, thin, stringy metal chips can be formed. These long, thin chips can adhere together, in a "bird nesting" effect, which can clog the drilling fluid flow passages.

In order to promote the cutting of relatively short metal chips from the workpiece with the whole cutting inserts, at least two types of features sometimes have been employed. One such feature has been the provision of a surface irregularity on the front face of each cutting insert, to curl each metal chip back toward the workpiece until it breaks off at a relatively short length.

The second such chip breaking feature has been to tilt the front face of each insert at a non-orthogonal attack angle relative to the surface of the workpiece. In this context, the term "rake angle" has been used to refer to the condition where one portion of the front face of the insert is advanced ahead of another portion, in the direction of rotation of the cutting tool. The degree of advancement is usually small, with approximately 20° being the upper limit, resulting in an angle between the front face of the cutting insert and the surface of the workpiece of 70° to 90°. The rake angle can be "positive" or "negative", depending upon which portion of the front face of the cutting insert is advanced. If the leading portion of the front face contacts the workpiece surface, a "positive" rake angle is said to exist. If the trailing portion of the front face contacts the workpiece surface, a "negative" rake angle is said to exist. The use of a rake angle can cause the front face of the insert to "drag" across the workpiece, or to "gouge" the workpiece, depending upon the particular type of rake angle employed, and depending upon the contour of the cutting portion of the insert. A negative rake angle is generally considered to achieve the best chip breaking effect.

The front face of the insert can have a "radial" rake angle, where the front face lies in a plane which is parallel to the rotational axis of the cutting tool, but which extends non-radially from the cutting tool. Or, the front face of the insert can have an "axial" rake angle, where the front face lies in a plane which intersects, but does not contain, the rotational axis of the cutting tool. Or, the front face of the insert can have a "compound" rake angle having both radial and axial components.

A rake angle on the front face of the cutting insert can be the result of an angle on the cutting tool surface on which the cutting insert is mounted, or an angle between the front face of the cutting insert and the rear face, or both.

When tungsten carbide aggregate has been used as the cutting elements instead of whole cutting inserts, it has not been possible to employ either of the two chip breaking features discussed above. The tungsten carbide particles used as cutting elements in the aggregate are not uniform either in material or in conformation. They are typically made by crushing whole inserts or worn out tungsten carbide machine components, such as extrusion dies, rollers, or hammers. This produces a wide assortment of shapes and sizes of particles, or chunks, of varying formulations of tungsten carbide material. Some of these particles or chunks are not even "cutting grade" tungsten carbide, and some of the faces or edge profiles of these particles or chunks are not suitable for use on cutting elements. Even where surface irregularities are present on the crushed carbide particles, they are not uniformly distributed or optimally arranged on the front face of each cutting element, so their effect is greatly reduced or eliminated.

The crushed aggregate is typically applied to the cutting tool in a more or less random pattern, and each particle is randomly oriented on the surface of the cutting tool. In one method, the crushed aggregate is formed into a solid bar by randomly suspending the particles in a matrix of brazing material, such as a nickel/brass matrix. The bar is then bonded to the cutting tool as a unit. In another method, the crushed aggregate is randomly suspended within a welding rod and then bonded directly to the cutting tool, by melting of the welding rod onto the cutting tool. In either method, it is impossible to control the orientation of each particle of tungsten carbide relative to the cutting tool. Therefore, it is impossible to control the angle at which the leading face or leading edge of each particle is ultimately presented to the workpiece. Further, it is difficult to arrange the particles in a uniform pattern on the cutting tool, since the particles are not of uniform size and shape. Even though the technician typically attempts to pack the crushed particles together for good coverage, some areas will have a higher concentration of smaller carbide particles, with few open spaces therebetween, while other areas will have a lower concentration of larger particles, with larger open spaces therebetween. Therefore, it is impossible to ensure that the various particles will achieve a uniform cutting pattern on the workpiece. The result is a relatively inefficient cutting tool.

The flat sided pyramid cutting insert is not particularly well suited to this cutting tool application, because each pyramid insert will almost certainly rest on one flat face, projecting a single point in the direction of rotation of the cutting tool. In this orientation, the three exposed flat side faces would be oriented at less than optimum angles for achieving the chip breaking effect.

Because of the relative inefficiency of the crushed tungsten carbide aggregate, the use of whole inserts arranged in a uniform pattern, with some type of chip breaking feature being employed, has come to be the industry standard for downhole milling and cutting. This efficiency has a price, however, in that the arrangement of cutting inserts in a uniform pattern, and the orientation of each insert at the optimum attack angle, add some expense and complexity to the cost of manufacturing the cutting tool. It is desirable to have a cutting element, and a method for applying cutting edges to a cutting tool, which will combine the simplicity of an aggregate cutting structure with the cutting efficiency of a uniform pattern of uniformly oriented identical cutting inserts.

BRIEF SUMMARY OF THE INVENTION

The present invention can be summarized as a cutting element for use on a tool for cutting or milling metal items downhole, and a method of applying such cutting elements to such cutting tools. The cutting elements applied to a given cutting tool can be identically sized and shaped, and constructed of a uniform cutting grade material. Alternatively, a mixture of shapes can be employed, with each shape being designed to present an effective cutting contour to the workpiece. Each cutting element is composed completely of a plurality of faces, with each face having a basic geometric shape, such as an equilateral triangle, or a square. All of the faces of a given element can be identical. Throughout this application, the term "substantially" is used. In general, the term "substantially" should be understood to mean "essentially or completely, with only insignificant exceptions". More specifically, the term is used herein to describe a cutting element which is "substantially" formed of a plurality of faces, with each such face having certain recited chip breaking characteristics. This means that all of the major faces are shaped to act as chip breakers. There could be very minor portions of the overall surface of the cutting element which are not thusly formed, but they are so minor that they do not alter the omnidirectional chip breaking function of the cutting element. Each face can be concave, in order to turn a metal chip back toward the workpiece surface and break it off at a short length. The cutting element can be cast of a high grade cutting formulation of tungsten carbide, or some other hard material. Alternatively, the cutting elements could conceivably be formed by other manufacturing processes. Each cutting element can have four, six, eight, or more concave faces. Each concave face of a cutting element can also have one or more surface irregularities therein, to act as additional chip breakers. These surface irregularities can be grooves, ridges, dimples, buttons, or other shapes capable of turning a metal chip back toward the surface of the workpiece.

Each cutting element is shaped so that, regardless of which face is bonded to the cutting tool, and regardless of the angular orientation of the cutting element, an effective cutting edge will always be applied to the workpiece. Each element is shaped so that it will have one of its faces bonded to the cutting tool, while the remainder of its faces are exposed. It does not matter which face is bonded to the cutting tool, because an arrangement of effective cutting faces will always be left exposed. Furthermore, this arrangement of effective cutting faces is designed so that, regardless of the angular orientation of the cutting element, an effective cutting edge will always be presented to the workpiece. Several shapes of cutting elements have been found to satisfy this requirement.

These cutting elements can be applied to the cutting tool in a substantially random fashion, such as the methods for application of the carbide particle aggregate discussed above, but the resulting pattern is far more uniform with the cutting elements of the present invention. This is because the cutting elements of the present invention are uniform in size and shape, so when tightly packed together, they tend to come to rest in a much more uniform pattern than would the varied assortment of crushed particles known in the prior art. Some of the cutting elements of the present invention are shaped such that several layers of the elements can be applied, in a relatively uniform fashion. Further, when the cutting elements of the present invention are applied to the cutting tool, the technician does not need to attempt to orient the individual cutting elements in any particular way. The cutting elements are designed so that, regardless of which face contacts the cutting tool, and regardless of how each cutting element is angularly oriented, an effective cutting edge will always be applied to the work piece.

The novel features of this invention, as well as the invention itself, will be best understood from the attached drawings, taken along with the following description, in which similar reference characters refer to similar parts, and in which:

DETAILED DESCRIPTION OF THE INVENTION

Figure 1:
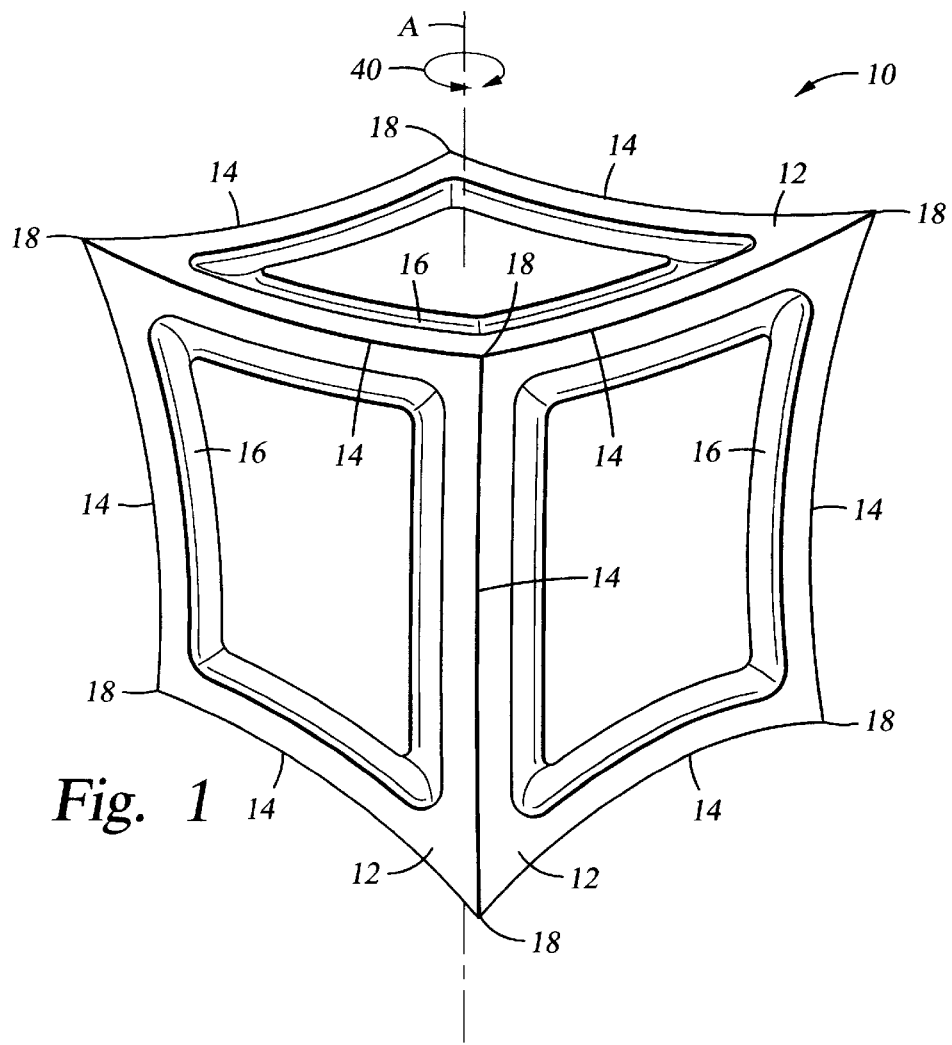
FIG. 1 is a perspective view of a cutting element according to the present invention, having six identical square concave faces.

As shown in FIG. 1, a first embodiment 10 of the cutting element of the present invention has six identical faces 12. Each face 12 is concave, but its perimeter is substantially square. The concavity of each face 12 makes it suitable for bending a metal chip back toward the workpiece surface and breaking it off at a short length. The concavity of each face 12 also establishes an effective attack angle relative to the workpiece surface. Each face 12 is surrounded by four sharp, curved, cutting edges 14. Optionally, each face 12 can have an integral surface irregularity 16, which is shaped and located to aid in breaking off short chips from the workpiece. The surface irregularity shown in each face 12 in FIG. 1 is a groove with a rounded cross-section, but it could also be a ridge protruding from the face 12. Alternatively, the surface irregularities 16 could be dimples, buttons, or any other irregularity suitable for turning a metal chip back toward the workpiece surface. Each of the four corners 18 of each face 12 can be sharp, as shown, or slightly rounded, without departing from the spirit of the present invention.

A plurality of the cutting elements 10 can be suspended in a nickel/brass matrix, in a bar (not shown). Then, the bar can be bonded onto the cutting tool (not shown) in one piece, by a process such as brazing. Similarly, a plurality of the cutting elements 10 can be suspended in a welding rod, and the welding rod can be melted onto the cutting tool. By either process, a plurality of the cutting elements 10 will be deposited on, and bonded to, the cutting tool. Virtually all of the cutting elements 10 will come to rest on the cutting tool on one of the faces 12, with an axis A through this face 12 being essentially orthogonal to the surface of the cutting tool onto which the cutting element has been bonded. Since all of the cutting elements 10 are identically sized and shaped, they will each present the same five-faced contour protruding from the cutting tool. Since all of the cutting elements 10 are identically sized and shaped, they will also easily pack together in a relatively uniform pattern having a relatively constant distribution of cutting elements 10 per square inch of cutting tool surface. Because of the cubical shape of the cutting element 10, several layers of the cutting element can be bonded to the cutting tool in a relatively uniform fashion.

Once a given cutting element 10 is positioned with one face 12 against the cutting tool, there is only one degree of freedom remaining, that being the angular orientation about the axis A, as represented in FIG. 1 by the arrow AO. Regardless of the final angular orientation AO of the cutting element 10, because of the uniformity of the six faces 12 and the concavity of each face 12, an efficient cutting edge 14 or corner 18 will be presented to the workpiece surface. The concavity of the face 12 establishes a proper attack angle for cutting a metal chip from the workpiece, breaking the chip off at a relatively short length.

The fact that each cutting element 10 constitutes an efficient cutting element, regardless of its positioning or orientation on the cutting tool, enables the placement of a plurality of the cutting elements 10 on the cutting tool in a substantially random fashion, such as the methods described above. Relatively rapid and economical placement of the cutting elements 10 is therefore possible, without detracting from the cutting efficiency of the resultant cutting tool.

Figures 2, 3:
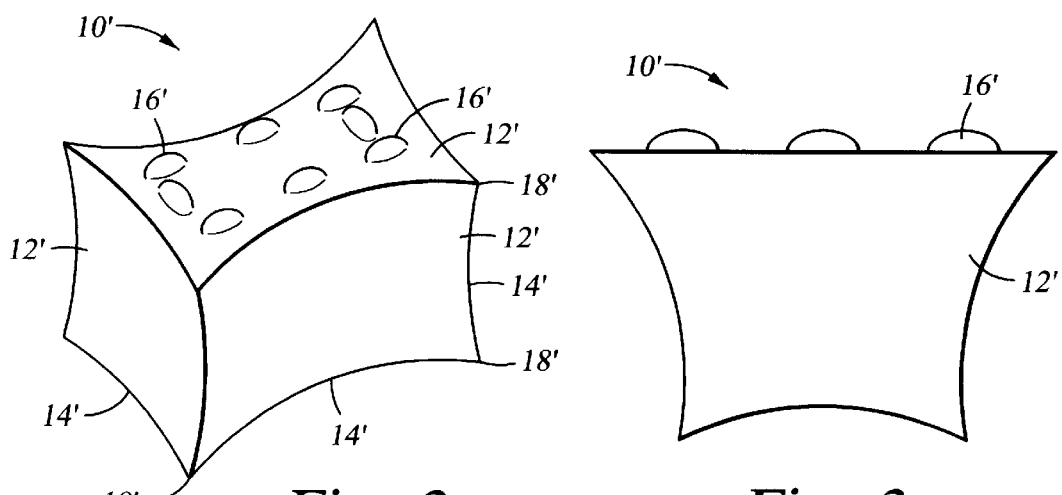
FIG. 2 is a perspective view of a cutting element according to the present invention, having faces with button for chip breakers.
FIG. 3 is a side elevation view of the element shown in FIG. 2.

A second embodiment 10', shown in FIGS. 2 and 3, has six faces 12'. Each face 12' can be concave or flat, but its perimeter is substantially square. One or more faces can be slightly larger or smaller than the remaining faces. Where concave faces are used, the concavity of each face 12' makes it suitable for bending a metal chip back toward the workpiece surface and breaking it off at a short length. The concavity of each face 12' also establishes an effective attack angle relative to the workpiece surface. Each face 12' is surrounded by four sharp, curved, cutting edges 14'. Optionally, either alternatively or additionally, each face 12' can have an integral surface irregularity 16', which is shaped and located to aid in breaking off short chips from the workpiece. The surface irregularities shown in each face 12' in FIGS. 2 and 3 are buttons with rounded crosssections protruding from the face 12', but they could also be dimples recessed into the face 12'. Alternatively, the surface irregularities 16' could be grooves, ridges, or any other irregularity suitable for turning a metal chip back toward the workpiece surface. Each of the four corners 18' of each face 12' can be sharp, as shown, or slightly rounded, without departing from the spirit of the present invention.

A plurality of the cutting elements 10' can be suspended in a nickel/brass matrix, in a bar (not shown). Then, the bar can be bonded onto the cutting tool (not shown) in one piece, by a process such as brazing. Similarly, a plurality of the cutting elements 10' can be suspended in a welding rod, and the welding rod can be melted onto the cutting tool. By either process, a plurality of the cutting elements 10' will be deposited on, and bonded to, the cutting tool. Virtually all of the cutting elements 10' will come to rest on the cutting tool on one of the faces 12', with an axis A through this face 12' being essentially orthogonal to the surface of the cutting tool onto which the cutting element has been bonded. All of the cutting elements 10' are sized and shaped so that they will each present an effective five-faced cutting contour protruding from the cutting tool. Since the cutting elements 10' are similarly sized and shaped, they will also easily pack together in a relatively uniform pattern having a relatively constant distribution of cutting elements 10' per square inch of cutting tool surface. Because of the essentially cubical shape of the cutting element 10', several layers of the cutting element can be bonded to the cutting tool in a relatively uniform fashion.

Once a given cutting element 10' is positioned with one face 12' against the cutting tool, there is only one degree of freedom remaining, that being the angular orientation about an axis, similar to the axis A represented in FIG. 1. Regardless of the final angular orientation AO of the cutting element 10', because all of the six faces 12' constitute effective cutting contours, an efficient cutting edge 14' or corner 18' will be presented to the workpiece surface. The concavity of the face 12' or the integrated chip breaker 16' establishes a proper attack angle for cutting a metal chip from the workpiece, breaking the chip off at a relatively short length.

The fact that each cutting element 10' constitutes an efficient cutting element, regardless of its positioning or orientation on the cutting tool, enables the placement of a plurality of the cutting elements 10' on the cutting tool in a substantially random fashion, such as the methods described above. Relatively rapid and economical placement of the cutting elements 10' is therefore possible, without detracting from the cutting efficiency of the resultant cutting tool.

Figure 4:
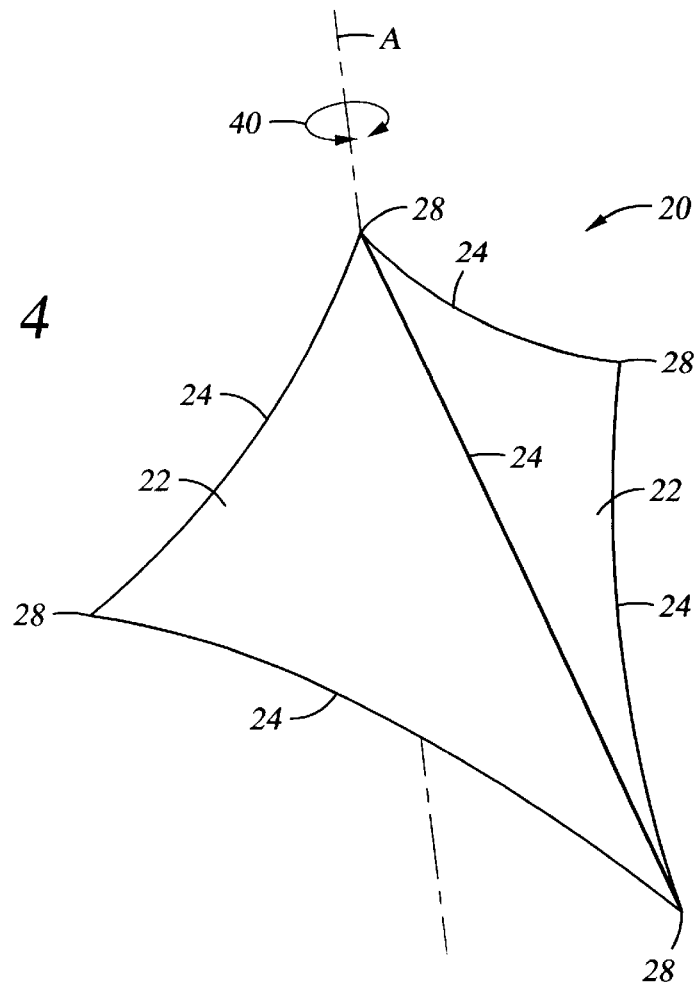
FIG. 4 is a perspective view of a cutting element according to the present invention, having four identical triangular concave faces.

A third embodiment 20 of the cutting element of the present invention, shown in FIG. 4, has four identical faces 22. Each face 22 is concave, but its perimeter is substantially an equilateral triangle. The concavity of each face 22 makes it suitable for bending a metal chip back toward the workpiece surface and breaking it off at a short length. The concavity of each face 22 also establishes an effective attack angle relative to the workpiece surface. Each face 22 is surrounded by three sharp, curved, cutting edges 24. Optionally, each face 22 can have an integral surface irregularity (not shown) similar which is shaped and located to aid in breaking off short chips from the workpiece. The surface irregularity in each face 22 can be a groove, but it could also be a ridge protruding from the face 22. Alternatively, the surface irregularities could be dimples, buttons as shown in FIGS. 2 and 3, or any other irregularity suitable for turning a metal chip back toward the workpiece surface. Each of the three corners 28 of each face 22 can be sharp, as shown, or slightly rounded, without departing from the spirit of the present invention.

A plurality of the cutting elements 20 can be suspended in a nickel/brass matrix, in a bar (not shown). Then, the bar can be bonded onto the cutting tool (not shown) in one piece, by a process such as brazing. Similarly, a plurality of the cutting elements 20 can be suspended in a welding rod, and the welding rod can be melted onto the cutting tool. By either process, a plurality of the cutting elements 20 will be deposited on, and bonded to, the cutting tool. Virtually all of the cutting elements 20 will come to rest on the cutting tool on one of the faces 22, with an axis A through this face 22 being essentially orthogonal to the surface of the cutting tool onto which the cutting element has been bonded. Since all of the cutting elements 20 are identically sized and shaped, they will each present the same three-faced contour protruding from the cutting tool. Since all of the cutting elements 20 are identically sized and shaped, they will also easily pack together in a relatively uniform pattern having a relatively constant distribution of cutting elements 20 per square inch of cutting tool surface.

Once a given cutting element 20 is positioned with one face 22 against the cutting tool, there is only one degree of freedom remaining, that being the angular orientation about the axis A, as represented in FIG. 4 by the arrow AO. Regardless of the final angular orientation AO of the cutting element 20, because of the uniformity of the four faces 22 and the concavity of each face 22, an efficient cutting edge 24 or corner 28 will be presented to the workpiece surface. The concavity of the face 22 establishes a proper attack angle for cutting a metal chip from the workpiece, breaking the chip off at a relatively short length.

The fact that each cutting element 20 constitutes an efficient cutting element, regardless of its positioning or orientation on the cutting tool, enables the placement of a plurality of the cutting elements 20 on the cutting tool in a substantially random fashion, such as the methods described above. Relatively rapid and economical placement of the cutting elements 20 is therefore possible, without detracting from the cutting efficiency of the resultant cutting tool.

Figure 5:
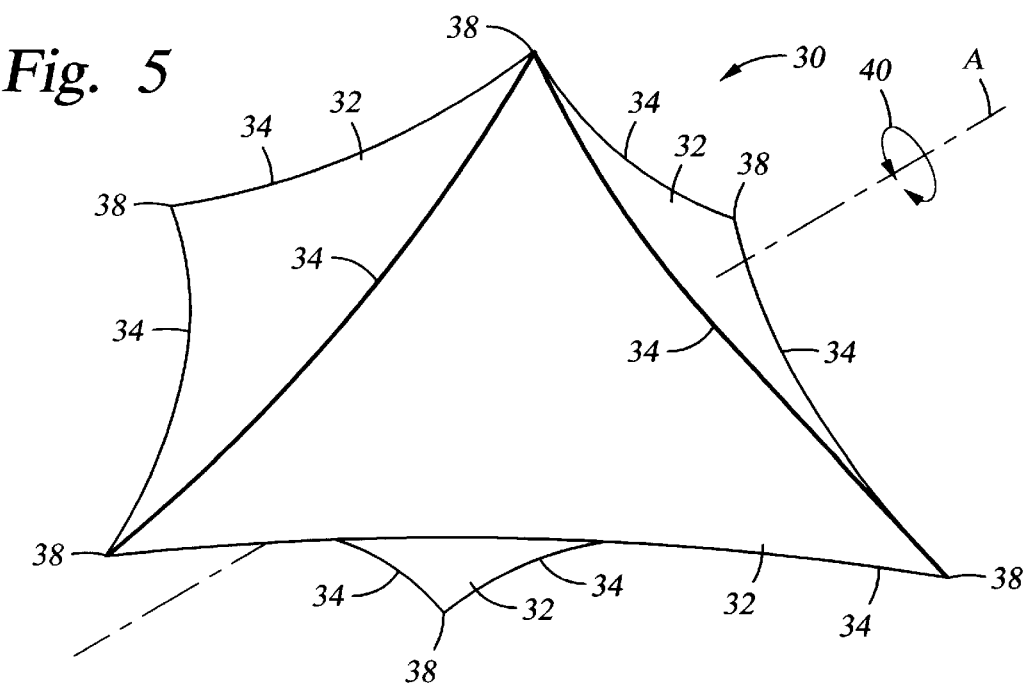
FIG. 5 is a perspective view of a cutting element according to the present invention, having eight identical triangular concave faces.

A fourth embodiment 30 of the cutting element of the present invention, shown in FIG. 5, has eight identical faces 32. Each face 32 is concave, but its perimeter is substantially an equilateral triangle. The concavity of each face 32 makes it suitable for bending a metal chip back toward the workpiece surface and breaking it off at a short length. The concavity of each face 32 also establishes an effective attack angle relative to the workpiece surface. Each face 32 is surrounded by three sharp, curved, cutting edges 34. Optionally, each face 32 can have an integral surface irregularity (not shown) similar to the surface irregularity 16 in FIG. 1 or surface irregularity 16' in FIGS. 2 and 3, which is shaped and located to aid in breaking off short chips from the workpiece. The surface irregularity in each face 32 can be a groove, but it could also be a ridge protruding from the face 32. Alternatively, the surface irregularities could be dimples, buttons as shown in FIGS. 2 and 3, or any other irregularity suitable for turning a metal chip back toward the workpiece surface. Each of the three corners 38 of each face 32 can be sharp, as shown, or slightly rounded, without departing from the spirit of the present invention.

A plurality of the cutting elements 30 can be suspended in a nickel/brass matrix, in a bar (not shown). Then, the bar can be bonded onto the cutting tool (not shown) in one piece, by a process such as brazing. Similarly, a plurality of the cutting elements 30 can be suspended in a welding rod, and the welding rod can be melted onto the cutting tool. By either process, a plurality of the cutting elements 30 will be deposited on, and bonded to, the cutting tool. Virtually all of the cutting elements 30 will come to rest on the cutting tool on one of the faces 32, with an axis A through this face 32 being essentially orthogonal to the surface of the cutting tool onto which the cutting element has been bonded. Since all of the cutting elements 30 are identically sized and shaped, they will each present the same seven-faced contour protruding from the cutting tool. Since all of the cutting elements 30 are identically sized and shaped, they will also easily pack together in a relatively uniform pattern having a relatively constant distribution of cutting elements 30 per square inch of cutting tool surface. Because each triangular face 32 of the cutting element 30 has an opposite parallel triangular face 32, several layers of the cutting element 30 can be bonded to the cutting tool in a relatively uniform fashion.

Once a given cutting element 30 is positioned with one face 32 against the cutting tool, there is only one degree of freedom remaining, that being the angular orientation about the axis A, as represented in FIG. 5 by the arrow AO. Regardless of the final angular orientation AO of the cutting element 30, because of the uniformity of the eight faces 32 and the concavity of each face 32, an efficient cutting edge 34 or corner 38 will be presented to the workpiece surface. The concavity of the face 32 establishes a proper attack angle for cutting a metal chip from the workpiece, breaking the chip off at a relatively short length.

The fact that each cutting element 30 constitutes an efficient cutting element, regardless of its positioning or orientation on the cutting tool, enables the placement of a plurality of the cutting elements 30 on the cutting tool in a substantially random fashion, such as the methods described above. Relatively rapid and economical placement of the cutting elements 30 is therefore possible, without detracting from the cutting efficiency of the resultant cutting tool.

While the particular invention as herein shown and disclosed in detail is fully capable of obtaining the objects and providing the advantages hereinbefore stated, it is to be understood that this disclosure is merely illustrative of the presently preferred embodiments of the invention and that no limitations are intended other than as described in the appended claims.

I claim:

1. A method for applying cutting elements to a tool for cutting metal in a well bore, said method comprising:
    providing a cutting tool;
    forming a plurality of cutting elements from a uniform material harder than a piece of metal to be cut, with each said cutting element being substantially formed of a plurality of cutting faces, with each said face being shaped to turn a metal chip cut from a piece of metal back toward the piece of metal being cut to break the chip off at a short length; and
    bonding a pattern of said plurality of cutting elements to said cutting tool.

2. A method for applying cutting elements to a cutting tool, as recited in claim 1, further comprising forming all said cutting elements in identical shapes and sizes.

3. A method for applying cutting elements to a cutting tool, as recited in claim 1, further comprising forming all of said plurality of faces of a given cutting element in identical shapes and sizes.

4. A method for applying cutting elements to a cutting tool, as recited in claim 1, wherein at least one said face of at least one said cutting element is concave.

5. A method for applying cutting elements to a cutting tool, as recited in claim 1, further comprising forming at least one chip breaking surface irregularity in at least one said face of at least one said cutting element.

6. A method for applying cutting elements to a cutting tool, as recited in claim 1, wherein at least one said face of at least one said cutting element is substantially rectangular.

7. A method for applying cutting elements to a cutting tool for cutting metal in a well bore, said method comprising:
    providing a cutting tool;
    forming a plurality of cutting elements from a uniform material harder than a piece of metal to be cut, with each said cutting element being substantially formed of a plurality of cutting faces, with each said face being shaped to turn a metal chip cut from a piece of metal back toward the piece of metal being cut to break the chip off at a short length; and bonding a pattern of said plurality of cutting elements to said cutting tool;

wherein at least one said face of at least one said cutting element is substantially triangular.

8. A method for applying cutting elements to a cutting tool for cutting metal in a well bore, said method comprising:

providing a cutting tool;

forming a plurality of cutting elements from a uniform material harder than a piece of metal to be cut, with each said cutting element being substantially formed of a plurality of cutting faces, with each said face being shaped to turn a metal chip cut from a piece of metal back toward the piece of metal being cut to break the chip off at a short length; and bonding a pattern of said plurality of cutting elements to said cutting tool;

wherein at least one said face of at least one said cutting element is substantially triangular;

wherein each said cutting element is formed of four of said substantially triangular faces.

9. A method for applying cutting elements to a cutting tool for cutting metal in a well bore, said method comprising:

providing a cutting tool;

forming a plurality of cutting elements from a uniform material harder than a piece of metal to be cut, with each said cutting element being substantially formed of a plurality of cutting faces, with each said face being shaped to turn a metal chip cut from a piece of metal back toward the piece of metal being cut to break the chip off at a short length; and bonding a pattern of said plurality of cutting elements to said cutting tool;

wherein at least one said face of at least one said cutting element is substantially triangular;

wherein each said cutting element is formed of eight of said substantially triangular faces.

10. A method for applying cutting elements to a cutting tool for cutting metal in a well bore, said method comprising:

providing a cutting tool;

forming a plurality of cutting elements from a uniform material harder than a piece of metal to be cut, with each said cutting element being substantially formed of a plurality of Cutting faces, with each said face being shaped to turn a metal chip cut from a piece of metal back toward the piece of metal being cut to break the chip off at a short length; and bonding a pattern of said plurality of cutting elements to a cutting tool;

wherein each said cutting element is formed of six substantially rectangular faces.

11. A method for applying cutting elements to a cutting tool for cutting metal in a well bore, said method comprising:

providing a cutting tool;

forming a plurality of cutting elements from a uniform material harder than a piece of metal to be cut, with each said cutting element being substantially formed of a plurality of cutting faces, with each said face being shaped to turn a metal chip cut from a piece of metal back toward the piece of metal being cut to break the chip off at a short length;

substantially randomly placing each said cutting element within a pattern; and bonding said pattern of said plurality of cutting elements to a cutting tool.

12. A method for applying cutting elements to a cutting tool for cutting metal in a well bore, said method comprising:

providing a cutting tool;

forming a plurality of cutting elements from a uniform material harder than a piece of metal to be cut, with each said cutting element being substantially formed of a plurality of cutting faces, with each said face being shaped to turn a metal chip cut from a piece of metal back toward the piece of metal being cut to break the chip off at a short length;

substantially randomly orienting each said cutting element relative to said cutting tool; and bonding a pattern of said plurality of cutting elements to a cutting tool.

13. A method for applying cutting elements to a tool for cutting metal in a well bore, said method comprising:

providing a cutting tool;

forming a plurality of identically shaped and sized cutting elements from a uniform material harder than a piece of metal to be cut, with each said cutting element being formed of a plurality of identically shaped and sized contiguous faces;

arranging said plurality of cutting elements in a substantially random pattern on said cutting tool;

orienting each said cutting element in a substantially random fashion with respect to said cutting tool; and bonding said substantially random pattern of said substantially randomly oriented plurality of cutting elements to said cutting tool.

14. A method for applying cutting elements to a cutting tool, as recited in claim 13, wherein each said face of each said cutting element is concave.

15. A method for applying cutting elements to a cutting tool, as recited in claim 13, further comprising forming at least one chip breaking surface irregularity in each said face of each said cutting element.

16. A cutting element for application to a tool for cutting metal in a well bore, said cutting element being substantially formed with a plurality of cutting faces, with each said face being shaped to turn a metal chip cut from a piece of metal back toward the piece of metal being cut to break the chip off at a short length, and with said cutting element being formed of a uniform material harder than the piece of metal being cut.

17. A cutting element as recited in claim 16, wherein all of said plurality of faces of said cutting element have identical shapes and sizes.

18. A cutting element as recited in claim 16, wherein at least one said face of said cutting element is concave.

19. A cutting element as recited in claim 16, further comprising at least one chip breaking surface irregularity formed in at least one said face of said cutting element.

20. A cutting element as recited in claim 16, wherein each said face of said cutting element is substantially rectangular.

21. A cutting element for application to a tool for cutting metal in a well bore, said cutting element being substantially formed with a plurality of cutting faces, with each said face being shaped to turn a metal chip cut from a piece of metal back toward the piece of metal being cut to break the chip off at a short length, and with said cutting element being formed of a uniform material harder than the piece of metal being cut, wherein each said face of said cutting element is substantially triangular.

* * * * *